United States Patent [19]
Asterö

[11] 4,455,893
[45] Jun. 26, 1984

[54] METHOD IN PRODUCING A MOULD FOR A LENS

[75] Inventor: Ulf J. Asterö, Östersund, Sweden

[73] Assignee: Optik Innovation AB OIAB, Östersund, Sweden

[21] Appl. No.: 395,039

[22] PCT Filed: Oct. 28, 1981

[86] PCT No.: PCT/SE81/00319
§ 371 Date: Jun. 21, 1982
§ 102(e) Date: Jun. 21, 1982

[87] PCT Pub. No.: WO82/01494
PCT Pub. Date: May 13, 1982

[30] Foreign Application Priority Data
Nov. 6, 1980 [SE] Sweden .................... 8007812

[51] Int. Cl.³ .............................................. B23K 26/00
[52] U.S. Cl. .......................... 76/107 R; 219/121 LE; 219/121 LH; 219/121 LW

[58] Field of Search ............... 76/107 R, 101 R; 219/121 LE, 121 LF, 121 LH, 121 LJ, 121 LU, 121 LY, 121 LM, 121 L, 121 LW

[56] References Cited
FOREIGN PATENT DOCUMENTS
2,804,479  5/1979  Fed. Rep. of Germany  219/121 LW

*Primary Examiner*—Roscoe V. Parker
*Attorney, Agent, or Firm*—Burns, Doane, Swecker & Mathis

[57] ABSTRACT

In a method for producing a lens, particularly a glass lens or a mould for casting a lens, particularly a plastics lens, a lens or mould blank (3) is given rotation about an axis of symmetry to the blank relative a material-removing tool (7) and the tool (7) is applied to the surface (4) of the blank (3). A laser unit (7) is utilized as a tool, and the beam (11) of the laser unit (7) is caused with its focus (12) to provide vaporization and/or fusion of the surface material (4) on the blank (3) which is to be removed.

8 Claims, 1 Drawing Figure

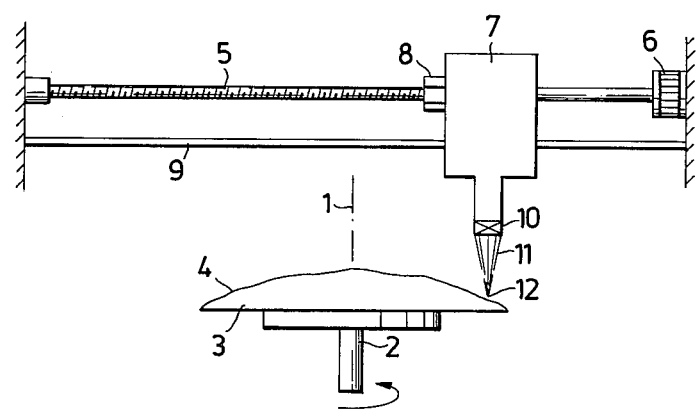

METHOD IN PRODUCING A MOULD FOR A LENS

TECHNICAL FIELD

The invention relates to a method in producing a lens, especially a glass lens, or a mould for casting a lens, especially a plastics lens, a lens blank or a mould blank being given rotation about a symmetrical axis of the blank relative to a material removal tool, the tool being engaged against the surface of the blank.

BACKGROUND ART

In producing aspherical lenses, a blank is manufactured with a shape generally corresponding to the final shape of the lens. This blank is mounted in a lathe or the like, and different tools are applied to the surface of the blank for machining its surface to its final form. The tools are subjected to a certain amount of wear, and the blank is subjected to the effect of forces, which result in an elastic deformation of the blank. This leads to machining errors. Each tool must have a tip configuration suited to the intended surface curvature in the respective machined partial area of the lens/mould. The tools must be sharpened. Friction between tool and blank causes vibrations which reduce the surface finish. All this leads to high machining costs and insufficient surface finish.

There is also substantial interest in producing aspherically corrected fresnel-type lenses, and especially with stepped surfaces which form an angle to the axis of the lens surface. Such lenses are extremely difficult to produce with current production methods.

There are corresponding problems in the production of moulds or dies with which aspherically corrected lenses of the kind mentioned above can be produced in a compression or ejection moulding operation. Such moulds usually consist of metal. The demands on the mould surface are naturally high also, and to reduce to some extent the disadvantages which are associated with the direct production of glass lenses of the kind in question, it has been proposed to utilize electrical-discharge machining of the metal mould surface. However, it has been found that electrical-discharge machining results in very small surface irregularities, which are less desirable. Moulds machined in this way are given a surface which looks like that of orange peel, when seen through a microscope.

It has therefore been considered necessary to keep to the turning technique in the direct production of glass lenses as well as moulds for compression or ejection moulding of lenses, particularly plastics lenses.

DE-OS No. 2,804,479 reveals a method of machining a workpiece wherein the workpiece, which has a polygonal periphery, is rotated and a laser beam is directed tangentially to the periphery in order to form a circular groove therein. The object is to avoid shock loads by the workpiece corners on a conventional tool applied against the periphery.

The present invention is not concerned with the problem of avoiding shock loads by the work piece on a tool but pertains to elimination of surface irregularities on lenses or lens moulds which would occur in conventional turning technique due to tool wear, vibration and misalingments in connection with tool exchange.

One object of the invention is therefore to provide a method offering up-to-standard surface accuracy for lenses or lens moulds.

CHARACTERIZATION OF THE INVENTION

According to the invention, it has been surprisingly found that machining a lens blank or a mould blank by means of a tool in the form of a laser unit, while utilizing the technique of turning, affords an up-to-standard result while utilizing simple work operations and tools. The laser beam of the laser unit is focused to vaporize and/or melt the material portions of the blank which are to be removed or displaced. Since the cutting tool comprises the focusing point on a laser beam coming from a laser unit, no contact pressures against the lens blank arise to deform it during the machining operation and no vibration will occur. Material will furthermore be removed by vaporization, and the material adjacent the focusing area of the laser beam is subjected to the action of heat resulting in fusion. This fusion smooths out the contour of the carefully preshaped blank in a desired mode, so that the contour is given approximately continuous first and second derivatives in the spaces between the machining areas, without using different contour-adapted tools. The focal point of the laser beam can be displaced in the axial direction of the blank by refocusing the laser beam and/or physical displacement of a fixed-focus laser unit. The blank treated in accordance with the invention has probably been preshaped into surface contours which closely conform to the desired final surface shape. Thus the blank can be preshaped by conventional turning technique by means of a conventional turning tool. The inventive method then smooths out the radial discontinuities between adjacent turning grooves and the circumferential irregularities caused by vibration at the course turning of the blank. It is, of course, quite possible to preshape the blank by other methods into a shape which closely conforms to the final shape, and then finalize the lens or mould by the inventive method, such that material is vaporized where necessary and the heat generated by the laser beam melts away or displaces material. In the inventive method the laser unit can furthermore be angularly adjusted in the axial plane to the rotation axis of the blank. Production of stepped surfaces on the lens is thus enabled, said surfaces being at an angle to the axis of the lens. In particular, undercut stepped surfaces can be provided on a lens in the direct production thereof.

Surface machining is preferably carried out in annular areas. The tool may thereby be radially displaced stepwise to mutually contiguous annular areas. However, there is no bar to carrying out surface machining in a mode such that the cutting point of the laser unit moves in a spiral path on the blank.

The invention is defined in the appended claims.

DRAWINGS

The appended drawing FIGURE schematically illustrates an apparatus for carrying out the method.

EMBODIMENT EXAMPLE

On the appended drawing FIGURE there is shown a tool holder 2 rotating round an axis 1 and symmetrically carrying a lens blank 3, the surface 4 of which is to be provided with a final form. A displacement screw 5 is arranged above the lens blank 3. The screw 5 is driven by a motor 6. A laser unit 7 is carried by the screw 5 with the aid of a nut means 8 for displacement along the screw 8 in response to rotation of the motor 6. The unit 7 is also guided by a rail 9 extending parallel to the screw 5. The screw 5 and rail 9 are preferably arranged at right angles to the axis 1, the direction of movement of the unit 7 preferably intersecting the axial direction 1. The laser unit 7 has a focusing means 10, with the aid of which the focus 12 of the beam 11 can be displaced. The refocusing motion of the focusing means 10 and the speed of the driving motor 6 (and thereby the movement of the unit 7 along the screw 5) can be controlled by a computer in a conventional mode so that the focus 12 of the beam 11 gives the blank 3 the intended surface configuration by vaporizing and/or melting the surface material of the blank 3. The motor 6 is preferably adapted to remain inactive while the blank 3 is rotated on the holder 2, so that the focus 12 of the laser unit 7 is given the opportunity of acting on the surface 4 of the blank 3 during several revolutions, in a narrow annular area of the surface 4 determined by the screw 5 and motor 6. The motor 6 can be adapted for stepwise displacement of the laser focus 12 of the unit 7 to the contiguous annular area which is to be surface-machined.

If so desired, the laser unit 7 can also be angularly displaceable relative to the screw 5 and rail 9, for allowing the production of undercut surface details on the blank 3, e.g. when the lens produced is to be of the Fresnel type.

Although an embodiment has been described above for direct production of a lens such as a glass lens, it should be understood that the apparatus shown could just as well be used for producing a compression or ejection mould for lenses such as plastics lenses.

It should also be clear that the lens blank or mould blank can be preheated for obtaining easier machinbility during the laser cutting operation.

The inventive method is primarily intended for final shaping of an aspheric surface on a lens or lens mould. The surface shaped by the method is not necessarily the final surface, as the laser irradiation could cause micro cracks or other defects in the shaped surface. Such micro cracks or other defects can then be eliminated by means of some polishing method which does not significantly change the surface profile produced by the inventive method.

I claim:

1. A method for production of a metal mould for moulding a rotational symmetric lens, comprising mechanically removing material from the surface of a mould metal blank to form a rotational symmetric blank surface having substantially the desired surface shape, and reducing the mould surface irregularities resulting from the material removing operation in order to form an optically smooth mould surface characterized thereby that said reducing comprises rotating the surface shaped blank about the axis of symmetry, directing a laser beam in parallel with said axis onto said blank surface, displacing the laser beam radially relative to said surface and bringing the laser beam to melt the top layer of the mould surface thereby to smooth out said irregularities.

2. A method as claimed in claim 1, characterized in that at least the surface portions of the blank are kept at heightened temperature while it is subjected to the action of the laser.

3. A method as claimed in claim 1 or 2, characterized in that the laser is caused to machine the blank surface in mutually consecutive annular areas.

4. A method as claimed in claim 3, characterized in that the cutting point of the laser is displaced in the direction of the axis by refocusing.

5. A method as claimed in claim 1 or 2, characterized in that the cutting point of the laser is displaced in the direction of the axis by displacing the laser unit in said direction.

6. A method as claimed in claim 3, characterized in that the cutting point of the laser is displaced in the direction of the axis by displacing the laser unit in said direction.

7. A method as claimed in claim 4, characterized in that the cutting point of the laser is displaced in the direction of the axis by displacing the laser unit is said direction.

8. A method as claimed in claim 3, characterized in that the laser is radially displaced stepwise to consecutive annular areas.

* * * * *